Nov. 20, 1934.  A. F. MARTIN  1,981,275
PROJECTION APPARATUS
Original Filed Aug. 9, 1930
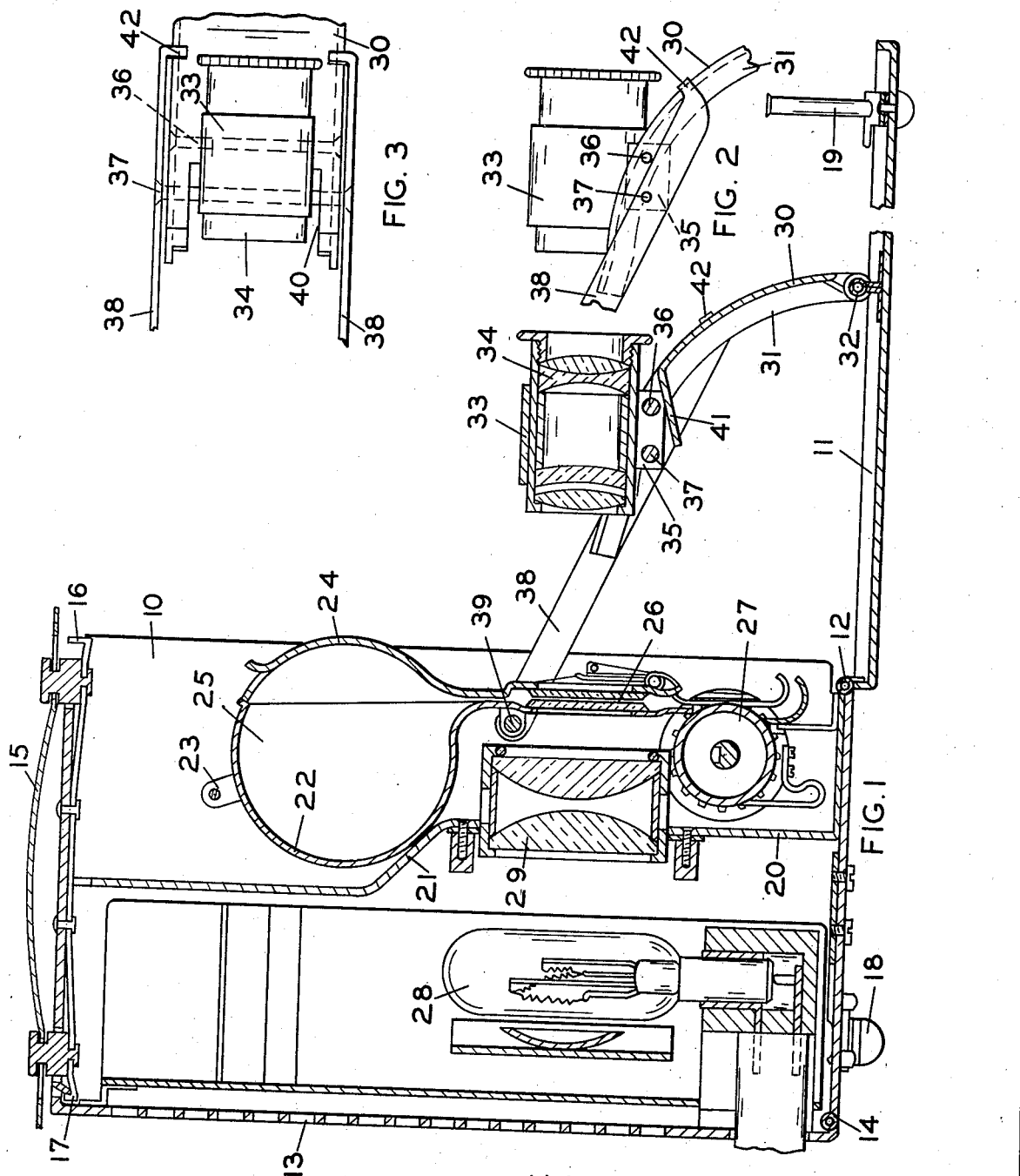
ALLAN F. MARTIN
INVENTOR
BY
ATTORNEY Patented Nov. 20, 1934

1,981,275

UNITED STATES PATENT OFFICE

1,981,275

PROJECTION APPARATUS

Allan F. Martin, Rochester, N. Y., assignor to Bausch & Lomb Optical Company, Rochester, N. Y., a corporation of New York Original application August 9, 1930, Serial No. 474,168. Divided and this application May 27, 1933, Serial No. 673,206

5 Claims. (Cl. 88—24)

This invention relates to projection apparatus and more particularly it has reference to a projector of the type wherein still pictures are projected from a film strip which is advanced one frame at a time.

This application is a division of my co-pending application Serial No. 474,168 filed August 9, 1930.

One of the objects of my invention is to provide an improved projector of the type described which will be compact and relatively simple in structure. Another object is to provide an improved means for mounting and positioning the objective lens on such a projector. Other objects and advantages reside in certain novel features of construction, arrangement and combination of parts as will hereinafter be more fully described and pointed out in the appended claims.

Referring to the drawing:

Fig. 1 is a vertical sectional view showing my projector arranged for operation.

Fig. 2 is a fragmentary side elevation showing the objective mount.

Fig. 3 is a top plan view of the objective mount.

One embodiment of my invention is illustrated in the drawing wherein 10 indicates a casing which is provided with a front door 11 hinged at 12 and a rear door 13 hinged at 14. The casing is provided with a suitable handle 15 and the front and rear doors are retained, respectively, in a closed position by means of spring catches 16 and 17 which cooperate with portions at the edges of the doors. The casing is also provided with suitable collapsible feet such as 18 and 19.

Secured within the casing 10 is a vertically extending wall 20 which forms a substantially light-tight partition and is provided with an off-set portion at 21. Mounted within the casing and positoned adjacent to the off-set portion 21 is the curved member 22 which is attached to the walls of the casing by integral ears 23. A curved member 24, which is hingedly mounted, cooperates with the member 22 to form a film receptacle 25. The lower portions of members 22 and 24 cooperate to form a film gate 26 through which the film is drawn by the feeding means 27. A suitable light source 28 and condensing lens 29 provide the necessary illumination. The details of the film gate and feeding means are described fully in my said co-pending application.

An arcuately curved bracket 30, having two side flanges 31, is hinged as at 32, to the inner side of the door 11. A lens tube 33, carrying the objective lens 34, is provided with downwardly extending ears 35 which are mounted to turn on the rod 36 which is carried between the flanges 31 of bracket 30. The ears 35 are also pivoted to turn on rod 37 which is carried between the two arms 38 which are pivoted as at 39 to the opposite inner walls of the casing 10. The upper end of bracket 30 has a cut-away portion 40 and an integral downturned stop member 41 against which the rod 36 contacts when the lens is in position for operation. The ends 42 of the arms 38 are turned inwardly and act as limiting stops for the bracket 30.

In operation, when the door 11 is opened and moved down to its limiting stop the lens 34 assumes a fixed position with its axis substantially horizontal. Upon closing the door 11, the lens 34, due to its pivotal mountings assumes a position above the film receptacle 25. I am therefore able to provide a compact structure and at the same time so mount the objective that it will automatically be brought into operative position upon opening the door. Various modifications can obviously be made without departing from the spirit of my invention.

I claim:

1. In a projection apparatus the combination of a casing having a hinged door, a dividing wall in said casing, said wall having an offset portion, a lens mounted on a bracket, said bracket being pivotally connected to said door and casing whereby the lens will be positioned automatically within said offset portion when the door is closed.

2. In a projection apparatus the combination of a casing having a hinged door, a bracket pivotally mounted on said door, a lens tube pivotally mounted on said bracket and a pair of arms pivotally connected to said tube and said casing, said arms being pivoted to said casing at a point which is substantially in the plane of said lens tube when the latter is in operative position.

3. In a projection apparatus the combination of a casing having a door hinged thereto, a bracket having one of its ends hinged to said door, a tubular member hinged to the bracket adjacent its other end, said tubular member carrying an objective lens, a pair of arms pivotally connecting said tubular member and said casing and stop means on said arms adapted to contact with said bracket.

4. In a projection apparatus the combination of a casing having a door hinged thereto, a wall within said casing, said wall having an off-set portion, a film receptacle above said off-set portion, and a lens pivotally mounted on said door, said lens being mounted and constructed so as to occupy a position above said film receptacle when said door is closed.

5. In a projection apparatus the combination of a casing having a door hinged thereto, a bracket pivoted to said door, a pair of arms pivoted to said casing, a tubular member carrying a lens, said member having depending ears, two rods mounted to turn on said ears, one of said rods being fixedly secured to said bracket, the other being fixedly secured to said arms.

ALLAN F. MARTIN.